(12) United States Patent
Schmidt et al.

(10) Patent No.: US 8,278,390 B2
(45) Date of Patent: Oct. 2, 2012

(54) COATINGS WITH CARBINOL-FUNCTIONAL SILOXANE RESIN

(75) Inventors: Randall Gene Schmidt, Midland, MI (US); John Gilbert, Beverly Hills, MI (US); Gregory Menovcik, Northville, MI (US)

(73) Assignee: Dow Corning Corporation, Midland, MI (US)

( * ) Notice: Subject to any disclaimer, the term of this patent is extended or adjusted under 35 U.S.C. 154(b) by 228 days.

(21) Appl. No.: 12/293,610

(22) PCT Filed: Mar. 23, 2007

(86) PCT No.: PCT/US2007/007440
§ 371 (c)(1),
(2), (4) Date: Sep. 19, 2008

(87) PCT Pub. No.: WO2007/112094
PCT Pub. Date: Oct. 4, 2007

(65) Prior Publication Data
US 2010/0215847 A1    Aug. 26, 2010

Related U.S. Application Data

(60) Provisional application No. 60/785,287, filed on Mar. 23, 2006.

(51) Int. Cl.
*C08L 83/06* (2006.01)

(52) U.S. Cl. ........ 525/101; 525/100; 525/374; 525/377; 525/378; 525/379; 526/301; 528/25; 528/31

(58) Field of Classification Search ............ None
See application file for complete search history.

(56) References Cited

U.S. PATENT DOCUMENTS

| | | | |
|---|---|---|---|
| 2,979,514 A | 4/1961 | O'Brien et al. | |
| 3,479,328 A | 11/1969 | Nordstrom | |
| 3,674,838 A | 7/1972 | Nordstrom | |
| 4,126,747 A | 11/1978 | Cowherd, III et al. | |
| 4,279,833 A | 7/1981 | Culbertson et al. | |
| 4,340,497 A | 7/1982 | Knopf | |
| 4,758,632 A | 7/1988 | Parekh et al. | |
| 5,356,669 A | 10/1994 | Rehfuss et al. | |
| 5,412,049 A | 5/1995 | Argyropoulos et al. | |
| 5,952,439 A * | 9/1999 | Morita et al. | 525/476 |
| 5,994,479 A | 11/1999 | Green et al. | |
| 6,080,825 A | 6/2000 | Ohrbom et al. | |
| 6,084,038 A | 7/2000 | Ohrbom et al. | |
| 6,160,058 A | 12/2000 | Ohrbom et al. | |
| 6,239,212 B1 | 5/2001 | Green | |
| 6,461,735 B1 * | 10/2002 | Furuya et al. | 428/429 |
| 7,452,956 B2 | 11/2008 | Cheng et al. | |
| 2004/0209088 A1 * | 10/2004 | Retsch et al. | 428/447 |

FOREIGN PATENT DOCUMENTS

| | | |
|---|---|---|
| EP | 995 778 A2 * | 4/2000 |
| WO | WO9410211 | 5/1994 |
| WO | 2007112222 | 10/2007 |

* cited by examiner

*Primary Examiner* — Marc Zimmer
(74) *Attorney, Agent, or Firm* — Alan Zombeck

(57) ABSTRACT

A coating composition contains a carbamate-functional film-forming material, a carbinol-functional, nonlinear siloxane resin, and an aminoplast crosslinking agent. The composition provides excellent high-bake repair adhesion of a repair-coating layer over the initial coating.

7 Claims, No Drawings

COATINGS WITH CARBINOL-FUNCTIONAL SILOXANE RESIN

CROSS-REFERENCE TO RELATED APPLICATIONS

This application is a U.S. national stage filing under 35 U.S.C. §371 of PCT Application No. PCT/US07/007440 filed on Mar. 23, 2007, currently pending, which claims the benefit of U.S. Provisional Patent Application No. 60/785,287 filed Mar. 23, 2006 under 35 U.S.C. §119 (e). PCT Application No. PCT/US07/007440 and U.S. Provisional Patent Application No. 60/785,287 are hereby incorporated by reference.

BACKGROUND OF THE INVENTION

The invention relates to coating compositions, particularly for topcoats or coatings forming the outermost layer of composite coatings.

Clearcoat-basecoat composite coatings are widely used in the coatings art and are notable for desirable gloss, depth of color, distinctness of image and/or special metallic effects. Composite systems are particularly utilized by the automotive industry to achieve advantageous visual effects, especially a high degree of clarity. However, a high degree of clarity in the clearcoat makes it easier to observe defects.

Silicon-containing materials have been introduced into coating compositions to increase the resistance of coatings to surface scratching and marring. A coating layer with silicon-containing materials may have poor adhesion with subsequently applied coating layers, however, due to the low surface tension produced by the silicon atoms. Generally, when the silicon-containing materials are added to the outer coating layer for scratch and mar resistance it is contemplated that no further coating layer will be applied over this outer coating layer. It sometimes becomes necessary to apply a further layer, however, such as when a defect in the outer coating must be repaired by applying a repair coating layer. A successful repair requires good adhesion of the repair coating layer to the underlying coating layer, which may be compromised when the underlying coating layer includes silicon-containing materials. Extra steps must then be taken to assure good adhesion of the repair coat, for example sanding and cleaning the underlying coating before applying the repair coating layer.

BRIEF SUMMARY OF THE INVENTION

The present invention provides a coating composition containing a carbamate-functional film-forming material, a carbinol-functional, nonlinear polysiloxane resin, and an aminoplast crosslinking agent. In another aspect, the invention provides a method of performing a high-bake repair of an automotive clearcoat coating by applying the coating composition of the invention in a first layer, curing the applied first layer, and applying and curing a second layer of the coating composition of the invention.

The coating of the invention provide excellent scratch resistance while having excellent adhesion to high bake repair coating layers without use of special preparations or primer layers.

"A" and "an" a used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE INVENTION

The following description of the preferred embodiment(s) is merely exemplary in nature and is in no way intended to limit the invention, its application, or uses.

The coating compositions of the invention include a carbamate-functional film-forming material, a carbinol-functional, nonlinear siloxane resin, and an aminoplast crosslinking agent.

The carbinol-functional siloxane resin includes a structure

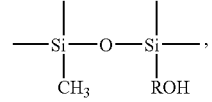

wherein R is a hydrocarbyl radical having less than or equal to five carbons, preferably three carbons, and more preferably is —$CH_2CH_2CH_2$—. It is contemplated that this structure may be formed by reaction of an alkene with a siloxane, e.g., with a platinum catalyst. The carbinol-functional siloxane resin has a three-dimensional lattice structure in which certain silicon atoms are bonded with three or more oxygen atoms. The siloxane resin preferably includes at least about 20 mole percent, preferably about 20 to about 80 mole percent of momoneric units having a structure

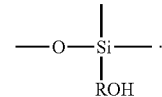

In certain embodiments, the weight average molecular weight of the carbinol-functional, nonlinear siloxane resin may be 1000 to 200,000, preferably 1000 to 80,000. Also in some embodiments, such weight average molecular weight may be at least about 2500, preferably at least about 3,000. In other embodiments, such weight average molecular weight may be up to about 30,000, preferably up to about 28,000.

The mole percent of siloxane units having carbinol functionality is a further consideration. In certain embodiments, from about 5 to about 25 mole percent of siloxane units have carbinol functionality. Also in certain embodiments, at least 5 mole percent of siloxane units have carbinol functionality. Still further, up to about 25 mole percent, preferably up to about 20 mole percent of siloxane units have carbinol functionality.

The carbinol-functional, nonlinear siloxane resin may be included in the clearcoat coating composition in an amount of at least about 0.1 weight percent, preferably at least about 0.2 weight percent, based on film-forming materials (fixed or nonvolatile vehicle). In certain embodiments, the carbinol-functional siloxane resin may be included in the clearcoat coating composition in an amount from 0.1 to about 20 weight percent, preferably from 0.1 to about 5 weight percent, based on film-forming materials (fixed or nonvolatile vehicle).

The carbamate-functional film-forming material may include an acrylic polymer having carbamate groups. A carbamate group according to the invention may be represented by the structure

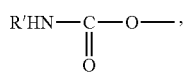

in which R' is H or alkyl. Preferably, R' is H or alkyl of from 1 to about 4 carbon atoms, and more preferably R' is H (a primary carbamate).

In general, an acrylic polymer with carbamate groups may be prepared in two ways. First, the acrylic polymer with carbamate groups may be prepared by polymerization using a monomer having a carbamate group. Secondly, the acrylic polymer may be prepared by polymerization of a monomer having functionality that can be converted to or adducted with carbamate functionality after polymerization. Any of the methods described in U.S. Pat. No. 6,160,058, the disclosure of which is incorporated herein by reference, may be used.

In the first method, the acrylic polymer is prepared by polymerization of a monomer having a carbamate group. For example, U.S. Pat. No. 5,412,049, incorporated herein by reference, discloses polymerization of the reaction product of an hydroxyl(meth)acrylate ester of an hydroxyalkyl carbamate compound.

In another embodiment of the first method, the acrylic polymer may be polymerized with a β-hydroxy carbamate monomer having the structure

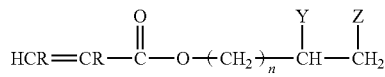

in which either each R is hydrogen or one R is hydrogen and the other R is methyl; n is from 1 to about 4, preferably 1; and one of Y and Z is OH and the other of Y and Z is a carbamate or urea group as already defined. In a typical synthesis of such a monomer, the reaction kinetics produces a product that is a mixture of the compounds in which Y is hydroxyl and Z is hydroxyl. When Y is the hydroxyl group, the monomer also provides a secondary hydroxyl group for the acrylic polymer.

One way of preparing a β-hydroxy carbamate monomer of this structure is by reacting a glycidyl-group containing polymerizable monomer first with carbon dioxide to convert the oxirane group to a cyclic carbonate group, and then with ammonia or a primary amine to convert the cyclic carbonate group to a β-hydroxy carbamate group. Examples of suitable oxirane group-containing polymerizable monomers include, without limitation, glycidyl acrylate, glycidyl methacrylate, glycidyl crotonate, and allyl glycidyl ether. Oxirane groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60-150 psi). The temperature for this reaction is preferably 60-150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3$ SnI, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group is reacted with ammonia or a primary amine. The primary amine preferably has up to four carbons, e.g. methyl amine. Preferably, the cyclic carbonate is reacted with ammonia. The ammonia may be aqueous ammonia (i.e., $NH_4OH$). The reaction ring-opens the cyclic carbonate to form a β-hydroxy carbamate monomer.

Another method of preparing a carbamate-functional monomer is by reacting a hydroxy-functional, ethylenically unsaturated monomer with cyanic acid, which may be formed by the thermal decomposition of urea or cyanuric acid. A further method is by reacting an isocyanate-functional or acid-functional ethylenically unsaturated monomer can be reacted with a hydroxyalkyl carbamate compound, such as hydroxypropyl carbamate, or with a hydroxy-containing epoxide compound with the epoxide group being subsequently converted to a carbamate group as described above. In a still further method, a hydroxyl-functional ethylenically unsaturated monomer may be reacted with an alkyl carbamate in a transesterification reaction to introduce the carbamate group. Another way to form a carbamate-functional, ethylenically unsaturated monomer is by reacting an acid-functional, ethylenically unsaturated monomer with an epihalohydrin compound, then reacting the oxirane group with carbon dioxide to form the carbonate, then reacting the carbonate ring with ammonia or a primary amine to form a primary carbamate or secondary carbamate, respectively. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Further details of synthesizing monomers having carbamate functionality are described, for example, in U.S. Pat. Nos. 3,479,328, 3,674,838, 4,126,747, 4,279,833, 4,340, 497, and 5,356,669 and WO 94/10211, the disclosures of each of which are incorporated herein by reference.

In the second method, an acrylic polymer is prepared having a functional group that is reacted after polymerization to provide a carbamate group. U.S. Pat. Nos. 4,758,632 and 5,356,669, the disclosures of each of which are incorporated herein by reference, describe preparing a polymer backbone having appended thereto at least one carbamate-functional group in this way. One technique involves thermally decomposing urea (to give off ammonia and HNCO) or cyanuric acid in the presence of a hydroxy-functional acrylic polymer to form a carbamate-functional acrylic polymer. Another technique involves reacting the hydroxyl group of a hydroxyalkyl carbamate with isocyanate groups or carboxylic acid groups on the acrylic polymer. Isocyanate-functional acrylics are prepared by polymerization of isocyanate vinyl monomers, which include unsaturated m-tetramethyl xylene isocyanate and isocyanatoethyl methacrylate. Examples of carboxylic acid functional acrylic polymers include those prepared by polymerization of acrylic acid, methacrylic acid, crotonic acid, and maleic anhydride which is hydrolyzed after synthesis. Yet another technique is to react the cyclic carbonate group on a cyclic carbonate-functional polymer with ammonia or a primary amine to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional polymer with an alkyl carbamate. A more difficult, but feasible way of preparing the polymer would be to trans-esterify a polymer with a hydroxyalkyl carbamate. A further method is to react a glycidyl group-containing acrylic polymer with carbon dioxide to produce a cyclic carbonate group, and then with ammonia or a primary amine as before to provide the carbamate functionality. Glycidyl-group containing acrylic polymers can be produced by copolymerzing glycidyl acrylate, glycidyl methacrylate, or allyl glycidyl ether, for example.

The acrylic polymer having carbamate functionality may be polymerized using one or more comonomers. Examples of such comonomers include, without limitation, α,β-ethylenically unsaturated monocarboxylic acids containing 3 to 5 carbon atoms such as acrylic, methacrylic, and crotonic acids and the esters of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The comonomers may be used in any desired combination to produce desired acrylic polymer properties.

The acrylic polymer may be prepared using conventional techniques, such as by heating the monomers in the presence of a polymerization initiating agent and optionally chain transfer agents. The polymerization is preferably carried out in solution, although it is also possible to polymerize the acrylic polymer in bulk. Suitable polymerization solvents include, without limitation, esters, ketones, ethylene glycol monoalkyl ethers and propylene glycol monoalkyl ethers, alcohols, and aromatic hydrocarbons such as xylene, toluene, and Aromatic 100.

Typical initiators are organic peroxides such as dialkyl peroxides such as di-t-butyl peroxide, peroxyesters such as t-butyl peroctoate and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis (cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol, and dimeric alpha-methyl styrene.

The solvent or solvent mixture may be heated to the reaction temperature and the monomers and initiator(s) and optionally chain transfer agent(s) added at a controlled rate over a period of time, typically from about two to about six hours. The polymerization reaction may usually be carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes, more preferably no more than about five minutes. Additional solvent may be added concurrently. The mixture may be held at the reaction temperature after the additions are completed for a period of time to complete the polymerization. Optionally, additional initiator may be added to ensure complete conversion of monomers to polymer.

The acrylic polymer may have a weight average molecular weight of at least about 2400, in some embodiments at least about 3000, in additional embodiments at least about 3500, and in certain preferred embodiments at least about 4000. Weight average molecular weight may be determined by gel permeation chromatography using polystyrene standard. In addition, the weight average molecular weight of certain embodiments may be up to about 5000, in some embodiments up to about 4750, and in still other embodiments up to about 4500. The acrylic polymer having carbamate functionality may have an equivalent weight, based on the carbamate functionality, of up to about 700 grams per equivalent, in some embodiments up to about 500 grams per equivalent, and in some embodiments up to about 425 grams per equivalent. The carbamate equivalent weight may be at least about 350 grams per equivalent.

The coating composition may further include a carbamate-functional material that is the reaction product of (1) a compound comprising a primary carbamate group and an hydroxyl group and (2) a compound that is reactive with hydroxyl groups on a plurality of molecules of compound (1), but that is not reactive with the carbamate groups on compound (1). The compound (1) may be, for example and without limitation, hydroxyethyl carbamate, hydroxypropyl carbamate, or hydroxybutyl carbamate. The compound (2) is preferably a diisocyanate, triisocyanate, isocyanurate or biuret thereof, mixture of such compounds. Particularly preferred compounds (2) are the isocyanurate of isophorone diisocyanate and the isocyanurate of hexamethylene diisocyanate.

The carbamate-functional compound that is the reaction product of compounds (1) and (2) may be included in the coating composition in an amount of about 5 weight percent to about 30 weight percent, based on the vehicle weight. In certain embodiments, the carbamate-functional compound may be included in the coating composition in an amount of from about 10 weight percent to about 15 weight percent, based on the vehicle weight. The "vehicle weight" is the total weight of the thermoset, film-forming components in the coating composition.

The coating composition may include other carbamate-functional compounds. Such carbamate-functional compounds include, without limitation, any of those described in U.S. Pat. Nos. 6,160,058, 6,084,038, 6,080,825, 5,994,479, the disclosures of which are incorporated by reference. In particular, the composition may include a carbamate-functional or urea-functional material comprising at least two functional groups, at least one of which is a carbamate or urea group that is the reaction product of (1) an hydroxyl group of a first compound that is the result of a ring-opening reaction between a compound with an epoxy group and a compound with an organic acid group and (2) cyanic acid or a carbamate or urea group-containing compound.

In another embodiment, the coating composition may include a carbamate-functional or urea-functional material that is the reaction product of (1) a compound comprising a carbamate or urea group and an active hydrogen group that is reactive with (2), and (2) a lactone or a hydroxy carboxylic acid. In a particularly preferred embodiment, the active hydrogen group of compound (1) is an hydroxyl group and the compound (2) is ε-caprolactone. The compound (1) may be, for example and without limitation, hydroxyethyl carbamate, hydroxypropyl carbamate, or hydroxybutyl carbamate.

In another embodiment, the coating composition may include a carbamate-functional or urea-functional material that is the reaction product of a first material (A) that is prepared by reacting (1) a compound comprising a primary carbamate or primary urea group and an hydroxyl group and (2) a lactone or a hydroxy carboxylic acid, as just described, further reacted with a second material (B) that is reactive with hydroxyl groups on a plurality of molecules of compound (A), but that is not reactive with the carbamate or urea groups on compound (A). For example, the compound (B) may be a polyisocyanate, especially an isocyanate, particularly the isocyanurate of isophorone diisocyanate. Again, the compound (2) is preferably ε-caprolactone.

In yet another embodiment, the coating composition may include a carbamate-functional or urea-functional material that is the reaction product of a first material (A) that is prepared by reacting (1) a compound comprising a primary carbamate or primary urea group and an hydroxyl group and (2) a lactone or a hydroxy carboxylic acid, as just described, further reacted with a second material or materials (B) that converts an hydroxyl group on the reaction product to a carbamate group, or a component comprising a group that is reactive with a hydroxyl group and a carbamate or urea group or group that can be converted to carbamate or urea. The hydroxyl group can be reacted, for example, without limitation, with monoisocyanates such as methyl isocyanate and butyl isocyanate, which react to form a secondary carbamate group; cyanic acid (which can be formed by the thermal decomposition of urea), which reacts with hydroxyl groups to form a primary carbamate group; or phosgene, followed by reaction with ammonia (primary carbamate group) or a primary amine (secondary carbamate group).

In another embodiment, the coating composition may include a carbamate-functional or urea-functional material that is the reaction product of (1) a first material that is the reaction product of a mixture including at least a polyisocyanate and an active hydrogen-containing chain extension agent with (2) a compound comprising a group that is reactive with said first material and a carbamate group or group that can be converted to carbamate. Suitable examples of the material (1) include, without limitation, the reaction product of a mixture including at least one of a diisocyanate, triisocyanate, isocyanurate or biuret thereof, mixture of such compounds, and at least one chain extension agent selected from 1,6-hexanediol, cyclohexanedimethylol, 2-ethyl-1,6-hexanediol, 3-hydroxy-2,2-dimethylpropyl 3-hydroxy-2,2-dimethylpropionate, 1,4-butanediol, and mixtures thereof. Suitable examples of compound (2) include, without limitation, hydroxyethyl carbamate, hydroxybutyl carbamate, hydroxypropyl carbamate, and combinations of these.

The coating composition further includes one or more aminoplast crosslinkers. Useful crosslinkers include, without limitation, materials having active methylol or methylalkoxy groups. Examples of such curing agent compounds include melamine formaldehyde crosslinkers, including monomeric or polymeric melamine formaldehyde resin and partially or fully alkylated melamine formaldehyde resin, urea resins, and methylol ureas such as urea formaldehyde resin, alkoxy ureas such as butylated urea formaldehyde resin.

In certain embodiments, the aminoplast crosslinker may be at least about 5%, more preferably at least about 10% by weight of the nonvolatile vehicle. "Nonvolatile vehicle" refers to the film-forming components. It is also preferred for the aminoplast crosslinker to be up to about 40%, more preferably up to about 30% by weight of the nonvolatile vehicle. In certain embodiments, the crosslinker may be from about 5% to about 40%, more preferably from about 10% to about 35%, and still more preferably from about 15% to about 35% by weight of the nonvolatile vehicle.

The coating composition may include a catalyst to enhance the cure reaction. For example, especially when monomeric melamines are used as a curing agent, a strong acid catalyst may be utilized to enhance the cure reaction. Such catalysts are well-known in the art and include, without limitation, ρ-toluene sulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine.

A solvent or solvents may be utilized in the coating composition used in the practice of the present invention. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

The coating composition according to the invention is useful as the clearcoat of an automotive composite color-plus-clear coating. Additional agents, for example surfactants, stabilizers, wetting agents, rheology control agents, dispersing agents, adhesion promoters, UV absorbers, hindered amine light stabilizers, etc. may be incorporated into the coating composition.

Coating compositions can be coated on the article by any of a number of techniques well-known in the art. These include, for example, spray coating, dip coating, roll coating, curtain coating, and the like. For automotive body panels, spray coating is preferred.

The coating composition of the invention is useful as a coating for various substrates such as wood, metal (including coil coatings), alloys, ceramic, plastic, and masonry. In addition, the coating composition according to the invention may be used as the clearcoat of a composite color-plus-clear coating. The pigmented basecoat composition over which it is applied may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The coating composition can be applied wet-on-wet over a basecoat coating composition as is widely done in the industry. The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources, generally temperatures between 90° C. and 180° C. In certain embodiments, the cure temperature may be between 115° C. and 150° C., and typically temperatures between 115° C. and 140° C. are used for a blocked acid-catalyzed system. For an unblocked acid-catalyzed system, the cure temperature typically may be between 80° C. and 100° C. The curing time will vary depending on the particular components used, and physical parameters such as the thickness of the layers; however, typical curing times range from 15 to 60 minutes, and more generally 15-25 minutes for blocked acid-catalyzed systems and 10-20 minutes for unblocked acid-catalyzed systems. The curing times may also be expressed as time after metal temperature reaches the bake temperature ("metal temperature"). For example, the curing time may be for 5 to 30 minutes, preferably 10 to 20 minutes, at metal temperature.

In a method repairing the clearcoat layer of an automotive coating, the clearcoat layer is sanded, if necessary, to remove a defect, then the clearcoat coating composition of the invention is applied over at least a portion of the clearcoat layer to form a second clearcoat layer, which is then cured. The second clearcoat layer may be cured at from 15 minutes at 265° to 30 minutes at 300° F., already mentioned. The clearcoat composition of the invention offers significant improvement in adhesion when applied over the cured first clearcoat layer.

EXAMPLES

The invention is illustrated by the following examples. The examples are merely illustrative and do not in any way limit the scope of the invention as described and claimed. All parts are parts by weight unless otherwise noted.

Examples

| | Example | | | | |
|---|---|---|---|---|---|
| | 1 | 2 | 3 | 4 | 5 |
| R10CG069 | 320 g | 320 g | 320 g | 320 g | 320 g |
| Siloxane resin | 0.0 | 0.11 | 0.22 | 0.67 g | 1.12 g |
| Adhesion | fail | fail | fail | pass | pass |

Coating compositions were prepared as shown in the above table using R10CG069 (lot101319739), a commercial product of BASF Corporation, and adding a nonlinear siloxane resin (69.5% N.V. carbinol functional siloxane resin in Aromatic 100, 25 mole percent —OSi(CH$_3$)$_2$((CH$_2$)$_2$CH$_2$OH), 72.7 mole percent

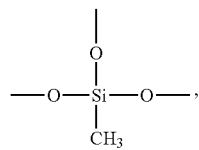

balance —OSi(CH$_3$)$_2$O—).

The adhesion test was run as follows. 4×12 inch eletrocoated (Cathogard 310B) panels were primed with G27AM127 powder primer from BASF Corp. Panels were then basecoated with R174KW502 from BASF Corp and flashed for 5 minutes at room temperature before clearcoating. The basecoat-clearcoat composite was then baked for 20 minutes metal temperature at 285° F. After baking, the panel was again clearcoated and baked for 20 minutes at 285° F. After cooling, the panel was scribed with a 1 mm crosshatch tool. Scotch Brand 898 adhesive tape was applied over the scribed area and pulled off. If any of the second coat of clearcoat was removed from the first coat, the result was recorded as fail. If none was removed, the result was recorded as pass.

Examples 4 and 5 passed the adhesion test.

The description of the invention is merely exemplary in nature and, thus, variations that do not depart from the gist of the invention are intended to be within the scope of the invention. Such variations are not to be regarded as a departure from the spirit and scope of the invention.

That which is claimed is:

1. A coating composition comprising a carbamate-functional film-forming material, at least 0.2 weight percent of a carbinol-functional, nonlinear siloxane resin having at least 20 mole percent of monomer units of a structure,

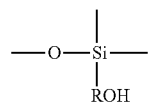

and an aminoplast crosslinking agent,
wherein the carbinol-functional, nonlinear siloxane resin includes 5 to 25 mole percent of a structure

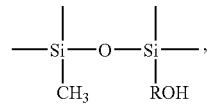

wherein R is —CH$_2$CH$_2$CH$_2$.

2. A coating composition according to claim 1, comprising from about 0.1 to about 20 weight percent of the carbinol-functional, nonlinear siloxane resin.

3. A coating composition according to claim 1, wherein the carbamate-functional film-forming material comprises an acrylic polymer having carbamate groups.

4. A coating composition according to claim 1, wherein the carbamate-functional film-forming material comprises a carbamate-functional material that is the reaction product of (1) a compound comprising a primary carbamate group and an hydroxyl group and (2) a compound that is reactive with hydroxyl groups on a plurality of molecules of compound (1), but that is not reactive with the carbamate groups on compound (1).

5. A coating composition according to claim 1, wherein the aminoplast crosslinking agent comprises a melamine formaldehyde resin.

6. A method of repairing an area of coating, comprising:

preparing the coating by applying and curing a coating composition comprising a carbamate-functional film-forming material, a carbinol-functional, nonlinear siloxane resin according to claim 1, and an aminoplast crosslinking agent and in the area of the coating to be repaired, applying a second layer of the coating composition comprising a carbamate-functional film-forming material, a carbinol-functional siloxane resin, and an aminoplast crosslinking agent and curing the second layer.

7. A method according to claim 6, comprising from about 0.1 to about 20 weight percent of the carbinol-functional, nonlinear siloxane resin.

* * * * *